United States Patent [19]
Holmes et al.

[11] 3,944,977
[45] Mar. 16, 1976

[54] ADAPTIVE AND PROGRAMMED THRESHOLD LEVEL DETECTION ARRANGEMENT

[75] Inventors: Thomas G. Holmes; Kenneth L. Seib, both of Melbourne, Fla.

[73] Assignee: Optical Business Machines, Melbourne, Fla.

[22] Filed: May 21, 1974

[21] Appl. No.: 472,069

[52] U.S. Cl. .................................... 340/146.3 AG
[51] Int. Cl.² ........................................ G06K 9/12
[58] Field of Search .......... 340/146.3 AG; 250/204, 250/567

[56] References Cited
UNITED STATES PATENTS

| | | | |
|---|---|---|---|
| 3,701,099 | 10/1972 | Hall et al. ................. | 340/146.3 AG |
| 3,714,397 | 1/1973 | Macey et al. ............. | 340/146.3 AG |
| 3,747,066 | 7/1973 | Vernot et al. ............. | 340/146.3 AG |
| 3,778,768 | 12/1973 | Brisk et al. ................. | 340/146.3 AG |

*Primary Examiner*—Joseph M. Thesz, Jr.
*Attorney, Agent, or Firm*—Rose & Edell

[57] ABSTRACT

A threshold level is automatically varied to follow variations in an input signal reference level. In the disclosed embodiment the reference level is that produced by photodiode-amplifiers in an OCR machine when viewing white or non-character portions of a page, the reference level varying as a function of the change in the length of the optical path during a scan across the page. The threshold level is compared to the input signal level to determine whether a character segment is viewed by the photodiode. Variation of the threshold level is achieved by low pass filtering individual output signals from some of the photodiode-amplifiers and then averaging the filtered signals to provide the adjusted threshold.

3 Claims, 5 Drawing Figures

ADAPTIVE AND PROGRAMMED THRESHOLD LEVEL DETECTION ARRANGEMENT

BACKGROUND OF THE INVENTION

The present invention relates to an adaptive threshold circuit in which a threshold level automatically changes in accordance with varying reference conditions, and more particularly to an adaptive threshold circuit suitable for use in an optical character recognition (OCR) machine. As described herein, the present invention constitutes a modification utilized in the OCR machine described in each of the following U.S. Patents and Applications which are incorporated herein by reference: U.S. Pat. No. 3,812,459; U.S. Pat. No. 3,872,433, and application Ser. No. 382,365, filed July 25, 1973, by Harrison B. Lidkea and Thomas G. Holmes, and entitled "Method and Apparatus for Recognizing Handwritten Characters In An Optical Character Recognition Machine".

The OCR machine described in the aforementioned Patent Applications employs a low power laser beam which scans across lines of a document to sequentially illuminate individual text character slices. Each illuminated slice is reflected by the scanning mirror back to a linearly extending array of photodiode elements. The scanning mirror is substantially centered relative to the document page so that the optical path subtends different angles relative to the document page and changes in length as a function of scan angle. More particularly, the mirror scans an angle of 15° on each side of the vertical center line of the document page. The reflected light from the document varies as a function of the fourth power of the cosine of the scan angle. Therefore the light gathered by the mirror at the end of a scan is reduced by approximately 13% in comparison with the light gathered by the mirror at the middle of the scan.

The photodiodes in the array drive individual amplifiers which provide output voltages for comparison with a threshold level to determine whether a character or non-character portion of the document is being viewed by each photodiode. The output voltage is at a relatively high reference level when a photodiode has a non-character or white portion of the document projected thereon. The voltage falls in response to projected character portions, the voltage level being lowest for the blackest or most non-reflective characters. Since the light gathered by the mirror changes during the scan, the photodiode amplifier output signal level is dependent upon scan position. In the system described in the aforementioned patent applications, the threshold level is maintained constant throughout a complete scan. Since the photodiode signal representing the projected image from the document varies as a function scan angle but the threshold level remains constant throughout the scan, the sensitivity of the detection circuitry is less at the ends of the scan. This characteristic may become particularly disadvantageous when sensing handwritten characters, especially those written with lead pencil, since such characters are more highly reflective than most standard machine print characters; that is, handwritten characters produce signal levels which are closer to the reference levels produced by the non-character portion of the document page. Under such circumstances the threshold level must be closer to the reference level. As mentioned previously, this reference level changes as a function of scan angle and consequently comes fairly close to the constant threshold level. It is therefore possible for signal noise to interfere with reliable threshold detection at the ends of the scan intervals.

The foregoing problem, of course, is not limited to optical character recognition machines but is present in any threshold detection arrangement wherein a reference condition is subject to change.

It is therefore an object of the present invention to automatically compensate a threshold detection circuit for changes occurring in a reference condition.

It is another object of the present invention to provide an adaptive threshold detection arrangement in which a threshold level is automatically varied in accordance with variations occurring in a reference level.

It is a more specific object of the present invention to provide a threshold detection arrangement in an optical character recognition machine wherein the threshold level is automatically compensated for changes occurring in the light-gathering capability of the optical system as a function of scan angle.

It is still another object of the present invention to provide an adaptive threshold detection system for use in an optical character recognition machine whereby the threshold level for character detection is automatically varied in accordance with the light-gathering capability of the machine at different scan positions.

SUMMARY OF THE INVENTION

In accordance with the present invention output signals from some of the photodiode amplifiers are fed through respective diodes to individual integrating circuits. The discharge time constants for the integrating circuits are chosen to enable these circuits to follow and maintain the relatively high level produced in response to viewing of the highly reflective non-character portions of the document page. The integrated levels are averaged and the resulting signal is utilized to control the threshold level in the detection circuits. Since the integrated signals substantially follow the reflective non-character portions of the document page, the integrated levels serve as a measure of the light-gathering capability of the optical system during the scan period. Consequently, the averaged signal for controlling the threshold level follows the light-gathering capability of the optical system and maintains a constant difference between the threshold level and the reference level produced by the non-character portions of the document.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF PREFERRED EMBODIMENTS

Figure 1:
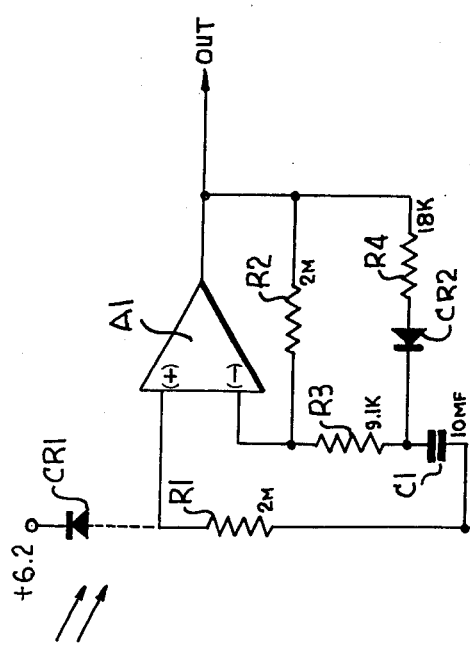
FIG. 1 is a schematic diagram of a photodiode and amplifier arrangement utilized in an optical character recognition machine of the type referred to herein.

The embodiment of the invention described herein relates specifically to the optical character recognition machine to which reference has been made hereinabove; it is to be understood however that the inventive concept described herein has considerably broader application. Referring specifically to FIG. 1 of the accompanying drawings, there is illustrated a circuit which represents one of sixty identical circuits employed in the OCR machine. The circuit includes photodiode CR1 which is one of sixty photodiodes in an array utilized to simultaneously view vertical samples of a document line being horizontally scanned by the optical portion of the OCR machine. Each photodiode CR1 has its cathode referenced to a +6.2 volt supply and its anode connected to the non-inverting input terminal of an operational amplifier A1. This non-inverting input terminal is also referenced to a 3.6 volt supply through resistor R1. The inverting input terminal of amplifier A1 is coupled to the +3.6 volt supply through the series combination of resistor R3 and capacitor C1. The amplifier output terminal provides the output signal from the circuit and is also coupled back to the inverting input terminal via negative feedback resistor R2. A series combination of resistor R4 and diode CR2 is connected between the amplifier output terminal and the junction between capacitor C1 and resistor R3, the cathode of diode CR2 being connected to the junction between R3 and C1.

Figure 2:
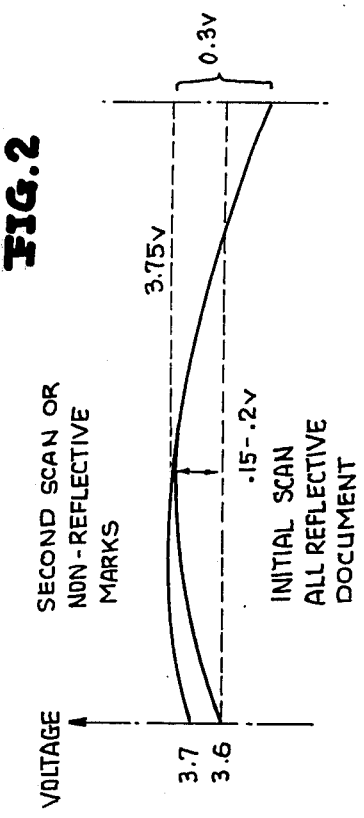
FIG. 2 is a plot of the output voltage from the amplifier of FIG. 1 versus time during a complete scan by the optical character recognition machine of a line containing the characters.

As described in the aforementioned U.S. Pat. No. 3,812,459, the scanning mirror of the OCR machine reflects laser light onto a vertical line on the document and then reflects the image from the illuminated portion of the document onto the photodiode array. The mirror scans at an angle of 15° on each side of the vertical center line of the document. Since the reflected light from the document varies as the fourth power of the cosine of the scan angle, the light gathered by the scan mirror at the end of the scan is 13% lower than the light gathered by the scan mirror at the middle of the scan. Referring to the plot of FIG. 2 in conjunction with the circuit of FIG. 1, the output voltage provided by amplifier A1 is +3.6 volts when the scan is at the left hand margin of the document. A reference level is established at the inverting input terminal of amplifier A1 by the charge across capacitor C1. The charge path for capacitor C1 is primarily resistor R4 and diode CR2. The charge time constant is determined by R4, C1 and the gain of amplifier A1, and is on the order of 2 milliseconds. The discharge path for capacitor C1 is primarily resistor R3 and the discharge time constant is on the order of 91 milliseonds. Consequently, capacitor C1 is able to quickly charge in response to the viewing of non-character portions of a document by diode CR1, and maintain that charge, because of the relatively long discharge time constant, as relatively non-reflective character portions of the document are viewed. Assuming that the initial scan line in FIG. 2 represents the output voltage from amplifier A1 as the scan mirror sweeps from left to right across an entire document page along a line which is devoid of character marks and therefore ultimately reflective, it is noted that the amount of light reflected onto the photodiode array increases as the scan progresses from the left hand margin to the center of the document. Theoretically the output level of amplifier A1 should not change during this portion of the scan because the output voltage should be clamped to 3.6 volts. However, there is a gradual increase to 3.75 volts at the output of amplifier A1 attributable to the forward impedance characteristic of photodiode CR1. After the mirror passes the center line of the document the amount of light received at the photodiode array decreases. This decrease is more pronounced than the increase occurring during the first half of the scan so that the amplifier output voltage is 3.45 volts at the right hand margin of the document. The difference between the 3.6 volt level at the left hand margin of the document and the 3.45 level at the right hand margin of the document may be explained as follows: The scan remains relatively stationary for a finite interval of time when viewing the left hand margin of the document prior to a scan and is therefore able to reach the clamp level of 3.6 volts at the output of amplifier A1. The scan is not stationary on the right hand side of the document however and the decreasing light intensity in that region has a greater effect on the amplifier output level. It is noted that the difference between the maximum and minimum voltages during the scan is 0.3 volts; theoretically this should be 0.4 volts (i.e. 13% of 3.6 volts) but the variation results from a partial recovery permitted by the 91 millisecond discharge time constants for capacitor C1.

An interesting phenomenon is observed when the scan reaches the left hand margin of the document during an immediate second scan of a totally blank (i.e. devoid of characters) line, or during the scan of an area having non-reflective marks close to the left margin. The effect renders the initial non-character reference level 0.1 volts higher than the 3.6 volt reference level, as illustrated by the 3.7 volt starting point for the second scan line in FIG. 2. This phenomenon is once again attributable to the forward impedance characteristic of photodiode CR1; specifically more current flows through the diode following a non-focus condition during a rescan, or after a non-reflective mark viewing condition.

Figure 4:
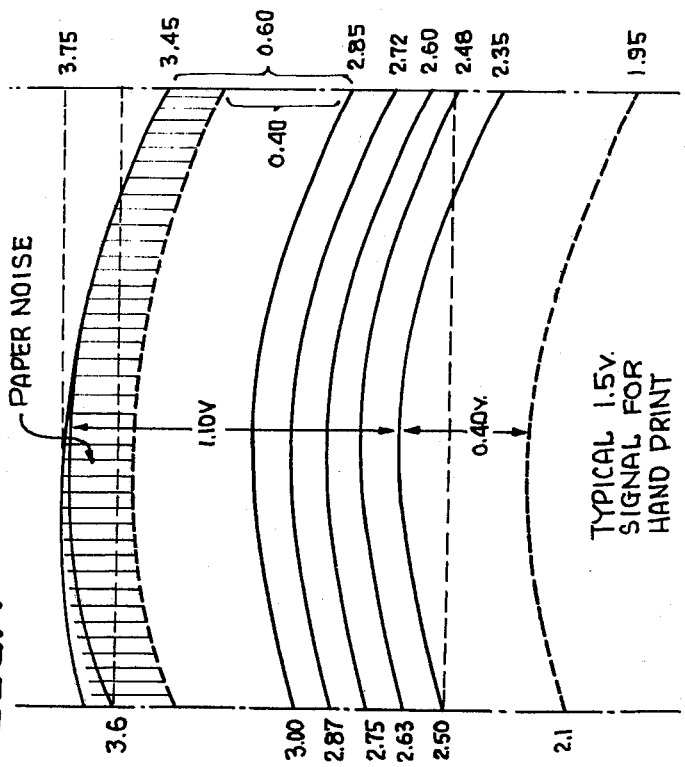
FIG. 4 is a plot of voltage versus time similar to that of FIG. 3 but wherein the threshold levels are rendered variable to conform to the variations of the reference level produced by the reflective non-character portions of the document being scanned.
Figure 3:
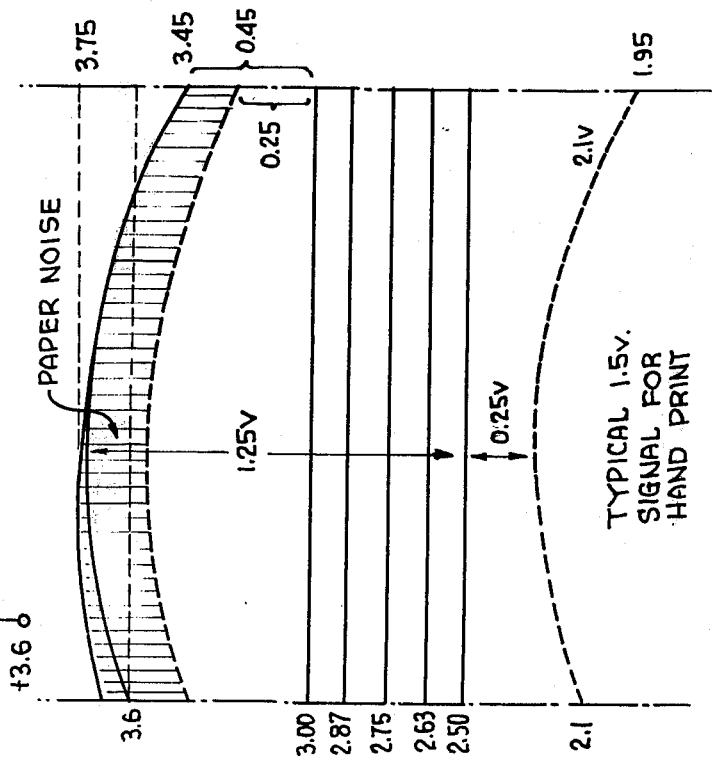
FIG. 3 is a plot of voltage versus time similar to that illustrated in FIG. 2 but further illustrating the relationship of the amplifier output signal to different threshold levels which are maintained constant throughout the scan interval.

It is important to note that FIG. 2 illustrates only the positive peak of the amplifier signal and not the variations which occur in the amplifier output signal due to paper noise. When not scanning the amplifier output signal typically carries a 50 to 70 millivolt peak-to-peak noise level, attributable primarily to the laser and inherent characteristics of the photodiode. This represents only 2 to 3% of the normal difference between reflective and non-reflective viewing conditions. During scan, a 220 millivolt peak-to-peak noise level is typically present on the amplifier output voltage as illustrated in FIGS. 3 and 4 by the shaded portion of the scan lines. This noise is attributable primarily to variations in the reflectivity of the document paper and represents approximately 8 to 10% of the difference between reflective and non-reflective signal levels.

The output signals from all sixty photodiode amplifiers of the type illustrated in FIG. 1 are processed at the quantizer-multiplexer board as illustrated in FIG. 89 of the aforementioned patent No. 3,872,433. The amplifier output levels are adjusted by potentiometers to provide equal amplitude differences between the white-to-non-reflective mark signal levels at the quantizer circuits. Considering the white or non-character reference level as being approximately 3.6 volts, the black or character segment signal levels are negative-going relative to that reference. These signal levels may vary from 2.0 to 3.5 volts below the reference level, depending upon the laser light level. A threshold level circuit for determining the black versus white decision is illustrated in FIG. 91 of the aforementioned U.S. Pat. No. 3,872,433. For machine print reading, this threshold level is set to a d.c. voltage which is 3.6 volts minus one-half of the white-to-non-reflective mark signal level difference. For example, assume that the signal level difference is 2.5 volts; then the threshold level would be set to 2.35 volts which is 3.6−2.5/2. A different threshold level must be employed for recognizing handwritten characters, especially those written with lead pencil, because such characters have a greater reflectivity than machine print characters. Since the reflectivity is greater, the signal for a non-reflective mark will have a smaller amplitude (i.e. will be closer to the reference level of 3.6 volts). Typically therefore the threshold level for handwritten characters is set to approximately 34% of the signal level below the white signal reference level. Thus for a 2.5 volt white-to-dark signal level difference the handwritten threshold is set at 2.75 volts (i.e. 3.6 − 2.5 × 0.34). In this example therefore, an amplifier output signal at or above 2.35 volts in the machine print mode is considered white or a non-character portion of the document whereas a signal below 2.35 volts is considered to be a character portion. Likewise in the handwritten mode a signal from a photodiode amplifier at or above 2.75 volts indicates that the photodiode associated with that amplifier is viewing a white or non-character portion of the document; a signal below the 2.75 volt threshold level from the amplifier indicates that the photodiode is viewing a character portion of the document.

As described in the aforementioned U.S. patent application Ser. No. 382,365, failure of the machine to recognize a character during certain modes of operation results in a rescan of the line containing the unrecognized character. The first two rescans raise the threshold level 5% (i.e. 125 millivolts) and 10% (i.e. 250 millivolts), respectively, of the white-to-dark signal difference, which effectively make the characters appear blacker and less reflective. The last two rescans of the line, which occur if the character is not recognized during the first two rescans, lower the threshold level by 5 and 10% respectively to make the character appear lighter or more reflective. The different threshold levels are illustrated in FIG. 3.

It will be noted from FIG. 3 that the system as thus far described maintains the threshold level during any individual scan constant throughout the entire scan. Thus, the initial 2.75 volt threshold level appears as a straight line across the entire scan interval even though the white or nonreflective reference level changes with scan angle. During a handwritten recognition mode this may present a problem. Specifically, the variation in reflectivity of handwritten characters can be considerable. Thus the signal from the photodiode amplifier during a handwritten recognition mode may be as great as the signal from a machine print character but more typically may be only a 60 to 70% of the machine print character output signal. Therefore, the expected hand print signal may be on the order of 1.5 to 1.75 volts below the 3.6 volt reference level rather than 2.5 volts below that reference level as is the case for machine print. The dashed scan line beginning at the 2.1 volt reference level in FIG. 3 represents a typical 1.5 volt signal for hand print. It is noted that the hand print signal, proximate the mid-point of the scan, approaches within 0.25 volts of the lowest rescan threshold level (i.e. a 2.5 volt threshold level). This 0.25 volt difference between actual signal level and threshold level can be considered marginal in terms of reliable recognition sensitivity. At the end of the scan the 220 millivolt peak-to-peak paper noise approaches within 0.25 volts of the highest rescan threshold level; this too is considered marginal. It is this problem, namely marginal recognition sensitivity at certain points of the scan, which results from the varying reference level at different points of the scan, to which the present invention offers a solution.

Figure 5:
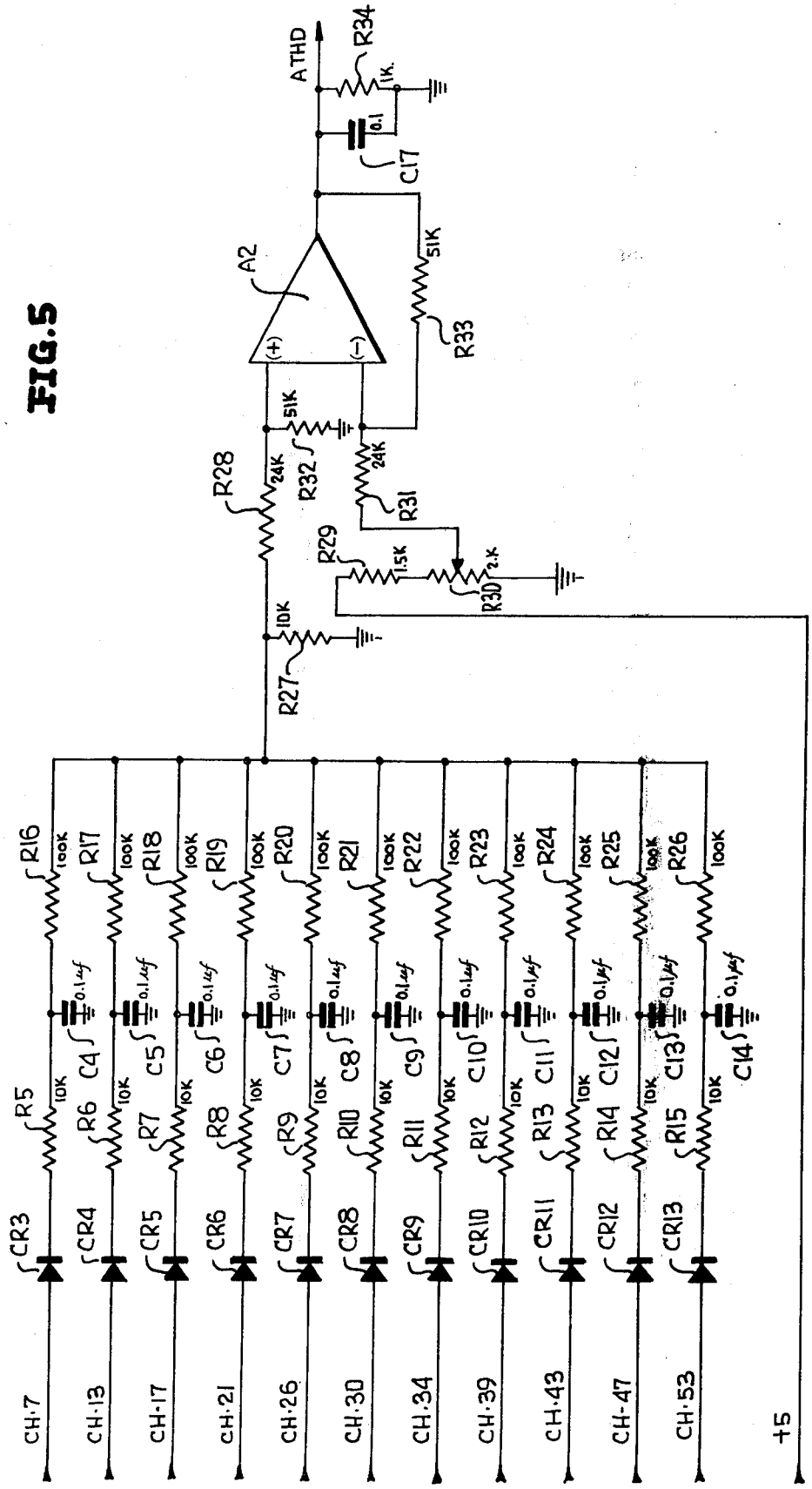
FIG. 5 is a schematic diagram of a circuit employed according to the present invention for rendering the threshold level of the character detection circuitry variable as a function of the light-gathering capability of the optical system.

In accordance with the present invention, the threshold levels employed during various scans and rescans are varied during the scan to follow the variations in the reference level. This approach is illustrated graphically in FIG. 4 wherein the shape of the threshold level plots versus scan position conforms to the shape of the reflective or non-character reference level plot. This arrangement maintains a substantially constant difference between the reference and threshold levels throughout the entire scan. The embodiment of the concept is illustrated in FIG. 5. The output signals from the photodiode amplifiers (reference FIG. 1) in each of channels 7, 13, 17, 21, 26, 30, 34, 39, 43, 47, and 53 of the photodiode array are utilized in an adaptive threshold detection level circuit. These eleven amplifier signals are evenly spaced over the center portion of the diode array. Each of the photodiode amplifier signals is passed through a respective diode CR3 through CR13 and resistor R5 through R15 to a grounded capacitor C4 through C14. The junction between the resistor and capacitor is resistively coupled via resistor R16 through R26 to a differential operational amplifier A2.

Considering the signal from the channel 7 photodiode amplifier as typical, the signal charges capacitor C4 through diode CR3 and resistor R5. The charging time constant is approximately 1 millisecond which is relatively short so that the capacitor is permitted to charge relatively quickly to the white or non-character reference level. A signal due to a character or mark does not discharge the capacitor C4 as rapidly because the diode is back biased to such discharge. However, capacitor C4 does discharge through R16 and resistor R27 coupled to ground with a discharge time constant on the order of 10 milliseconds. The combination of resistors R5 and R16 and capacitor C4 serve to filter out short highly positive voltage spikes which might occur due to specular reflection from the document page. The effectively integrated channel voltages are then averaged through the resistors R16 through R26 at the non-inverting input terminal of amplifier A2. A voltage divider including resistor R29 and potentiometer R30 applies an adjustable bias to the inverting input terminal of amplifier A2 to permit a normally zero output voltage from the differential amplifier to be obtained. The output signal, designated ATHD from amplifier A2 is low pass filtered by capacitor C17 and resistor R34 and applies to amplifier 9101 illustrated in FIG. 91 of the aforementioned U.S. Pat. No. 3,872,433.

Referring again to FIG. 4, the adaptive threshold circuit always maintains a minimum difference of 0.60 volts throughout the entire scan between the highest threshold level and the white or non-character reference level. This compares with the 0.45 difference occurring between these levels at the end of the scan in FIG. 3. This 33% improvement is considerable and is significant in improving the sensitivity of character recognition for handwritten characters. Likewise, the minimum difference between the typical hand print signal and the lowest threshold level is maintained at 0.40 volts whereas this minimum difference was 0.25 volts at the mid point of the scan in FIG. 3. This 40% improvement in detection sensitivity is also significant in improving the reliability of handwritten character recognition.

In a broad sense, diodes CR3 through CR13 may be looked upon as co-operating with capacitors C4 through C14 to provide reference level detectors. More particularly, the reference level, as produced by the white or non-character portions of the document, is higher than the signal level produced by the black or character portions of the document. When the signal sample is at the high reference level the capacitor is charged accordingly through the diode; however, the lower character level samples cannot affect the capacitor charge because the diode is back-biased. Increases in the reference level during a scan are reflected by increased charge on the capacitor. Decreased reference level during a scan results in discharge of the capacitor through resistor R16 (or R17 through R26) to permit the capacitor charge to follow the reference level with a lag of a few sample intervals. The detected reference level thus provides a dynamic control signal with which to adjust the threshold level to compensate for reference level changes. It will be appreciated, of course, that this technique can be made applicable to systems wherein the reference level is lower than the signal level by simply reversing the polarity of the diodes. The same technique is, of course, applicable to other than OCR systems to provide accurate threshold level adjustment in response to reference level changes due to drift, operating conditions, etc.

The essential characteristic of the present invention is an automatically adaptable threshold level which maintains a constant relationship to a varying reference condition. It is noted that the channel signals in FIG. 5 provide an average output signal which follows the white or non-character reference levels throughout the scan, irrespective of how such white reference level varies. More particularly, it is not simply a question of gearing the threshold level to the scan position; rather it is gearing the threshold signal to the reference signal itself to permit a truly adaptive relationship. It will be appreciated by those skilled in the art that this characteristic has applicability outside the field of optical character recognition machines. More particularly, in any threshold detection system wherein a reference condition for the threshold varies in accordance with a predetermined pattern or in a random manner it is possible to sample and average the reference signal and adjust the threshold level accordingly. Naturally the time constants of the sampling circuits would have to be adjusted to accommodate the types of changes espected in the reference levels; nevertheless, the concept of automatically tracking the reference level with the threshold level is readily embodied.

It is also to be understood that the particular choice of channels utilized to derive the threshold signal in FIG. 5 is by no means a limiting characteristic of the present invention. Fewer or more channels could be utilized and their particular location in the photodiode array could be changed. It was decided that to utilize the particular eleven channels represented in FIG. 5 for two reasons. The first relates to the fact that their positions make it quite likely that at least one of the channels at any time would be viewing a white or non-character portion of the document. The second reason is that the eleven amplifiers can be averaged to minimize the variations in the reference level at the beginning of a scan. The five or six channels at either end of the array are not used because of the fact that the character normally appears centered in the array and the end channels, therefore, rarely contain character segments.

While we have described and illustrated specific embodiments of our invention, it will be clear that variations of the details of construction which are specifically illustrated and described may be resorted to without departing from the true spirit and scope of the invention as defined in the appended claims.

We claim:

1. In an optical character recognition machine of the type in which a beam of light is caused to scan across successive lines of characters and reflect onto an array of sequentially adjacent photosensitive elements, each of which drives an amplifier to provide an electrical signal at a reference level when a non-character portion of the line is reflected thereon and at a character level when a character portion of the line is reflected thereon, a threshold control circuit for varying a threshold level to which said character level is compared in a character recognition process, said threshold control circuit serving to compensate for variations in said reference level, said threshold control circuit comprising:

a plurality of reference level storage circuits numbering less than half the number of said photosensitive elements, each reference level storage circuit comprising:

capacitive storage means;

a charge current path for said capacitive storage means having a relatively short time constant;

a discharge current path for said capacitive storage means having a relatively long time constant;

a diode in said charge current path connected and poled to conduct said electrical signal at said reference level from a respective one of said amplifiers as charging current to said capacitive storage means;

wherein the amplifiers providing electrical signals to said reference level storage circuits are driven by photosensitive elements which are all spaced from one another in said array to enhance the probability that at all times at least one of the spaced photosensitive elements has a noncharacter portion of a scanned line reflected thereon; and averaging circuit means connected in the discharge current path of each of said reference level storage circuits for averaging the levels stored in all of said capacitive storage means and providing said threshold level as a function of that average.

2. The combination according to claim 1:
wherein said charge current path includes a relatively small resistance connected in series with said diode and said capacitive storage means;
wherein said discharge current path includes a relatively large resistance connected in series with said diode and said capacitive storage means; and
wherein said averaging circuit means includes a differential amplifier circuit connected to provide said threshold level in proportion to the difference between the average charge across all of said capacitive storage means and an adjustable bias voltage.

3. The combination according to claim 1 wherein said photosensitive elements number sixty and are arranged in a single line, and wherein the amplifiers providing said electrical signals to said reference level storage circuits are driven by the seventh, thirteenth, seventeenth, twenty-first, twenty-sixth, thirtieth, thirty-fourth, thirty-ninth, forty-third, forty-seventh and fifty-third photosensitive elements in said single line.

* * * * *